United States Patent [19]
Smith, Jr.

[11] 3,747,790
[45] July 24, 1973

[54] DOUBLE SIDE SHIFTING FORK-TYPE STACKER

[75] Inventor: Raymond L. Smith, Jr., Southbury, Conn.

[73] Assignee: C & M Manufacturing Company, Inc., Bethesda, Md.

[22] Filed: Mar. 12, 1971

[21] Appl. No.: 123,793

[52] U.S. Cl. .......................... 214/730, 214/16.4 A
[51] Int. Cl. .............................................. B66f 9/14
[58] Field of Search ...................... 214/16.4 A, 730

[56] References Cited
UNITED STATES PATENTS

| | | | |
|---|---|---|---|
| 3,175,722 | 3/1965 | Paulssen | 214/16.4 A |
| 2,647,647 | 8/1953 | Alimanestiano | 214/16.1 CB |
| 2,751,093 | 6/1956 | Theibault | 214/95 R |
| 3,063,579 | 11/1962 | Alimanestiano | 214/16.1 CB |
| 1,768,360 | 6/1930 | Jenney | 214/16.1 EA |
| 2,014,351 | 9/1935 | Becker | 214/16.1 CB |
| 3,150,787 | 9/1964 | Patrignani | 214/514 |

Primary Examiner—Gerald M. Forlenza
Assistant Examiner—Lawrence J. Oresky
Attorney—Littlepage, Quaintance, Wray & Aisenberg

[57] ABSTRACT

To serve racks on opposite sides of a narrow warehouse aisle, forks are reciprocated horizontally through a fork-supporting head. The head is supported on top of a frame which may be rigid or movable with respect to a vertically moving carriage on a stacker. The head moves across the frame carrying locked forks into and out of the rack. Direction of the forks is changed by moving the head and forks simultaneously in opposite directions. In a preferred form of the invention, the frame on which the head is supported first moves toward the rack and upon sensing the rack enables the driving of the forks into the rack.

16 Claims, 6 Drawing Figures

INVENTOR
RAYMOND L. SMITH JR

INVENTOR
RAYMOND L. SMITH JR.

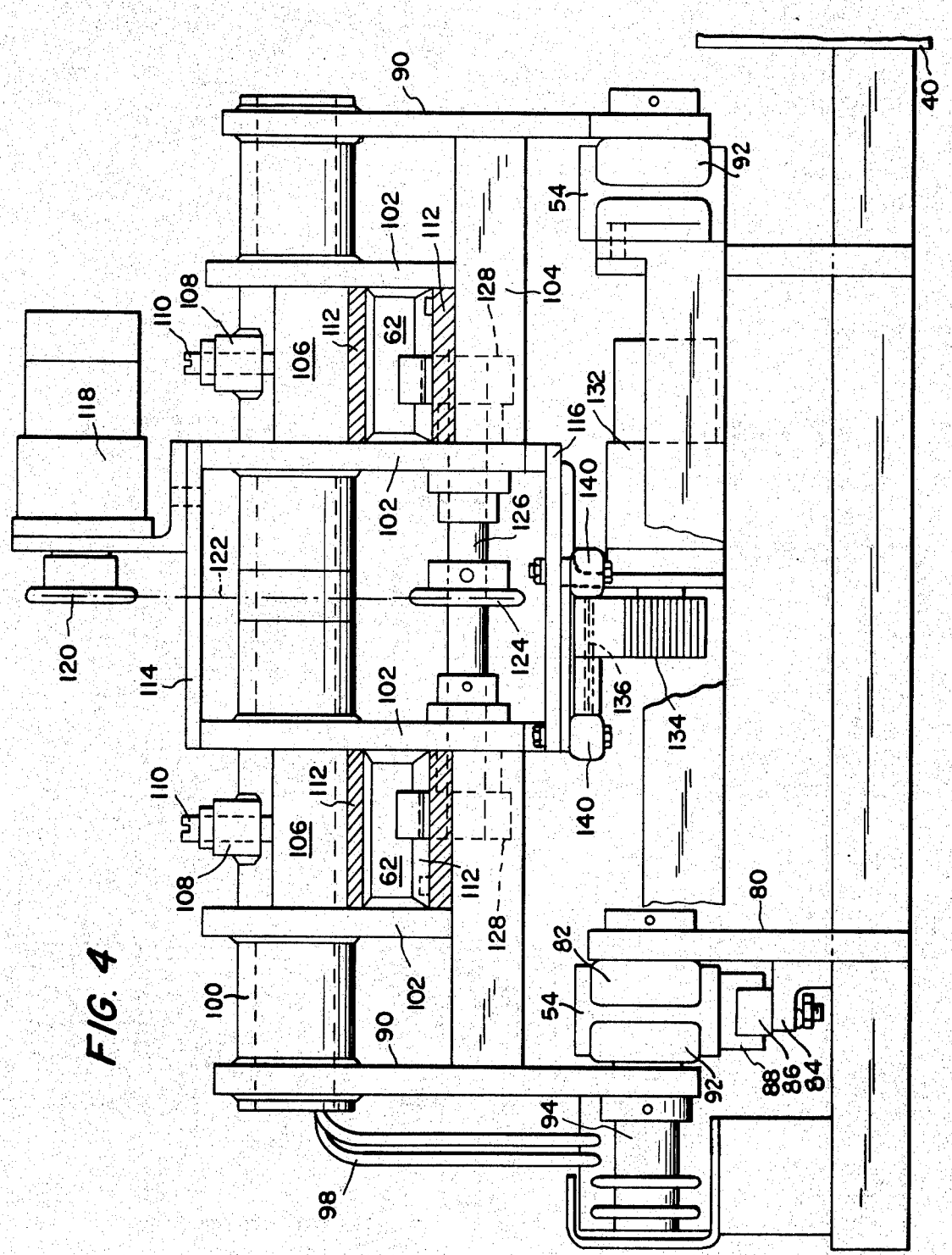

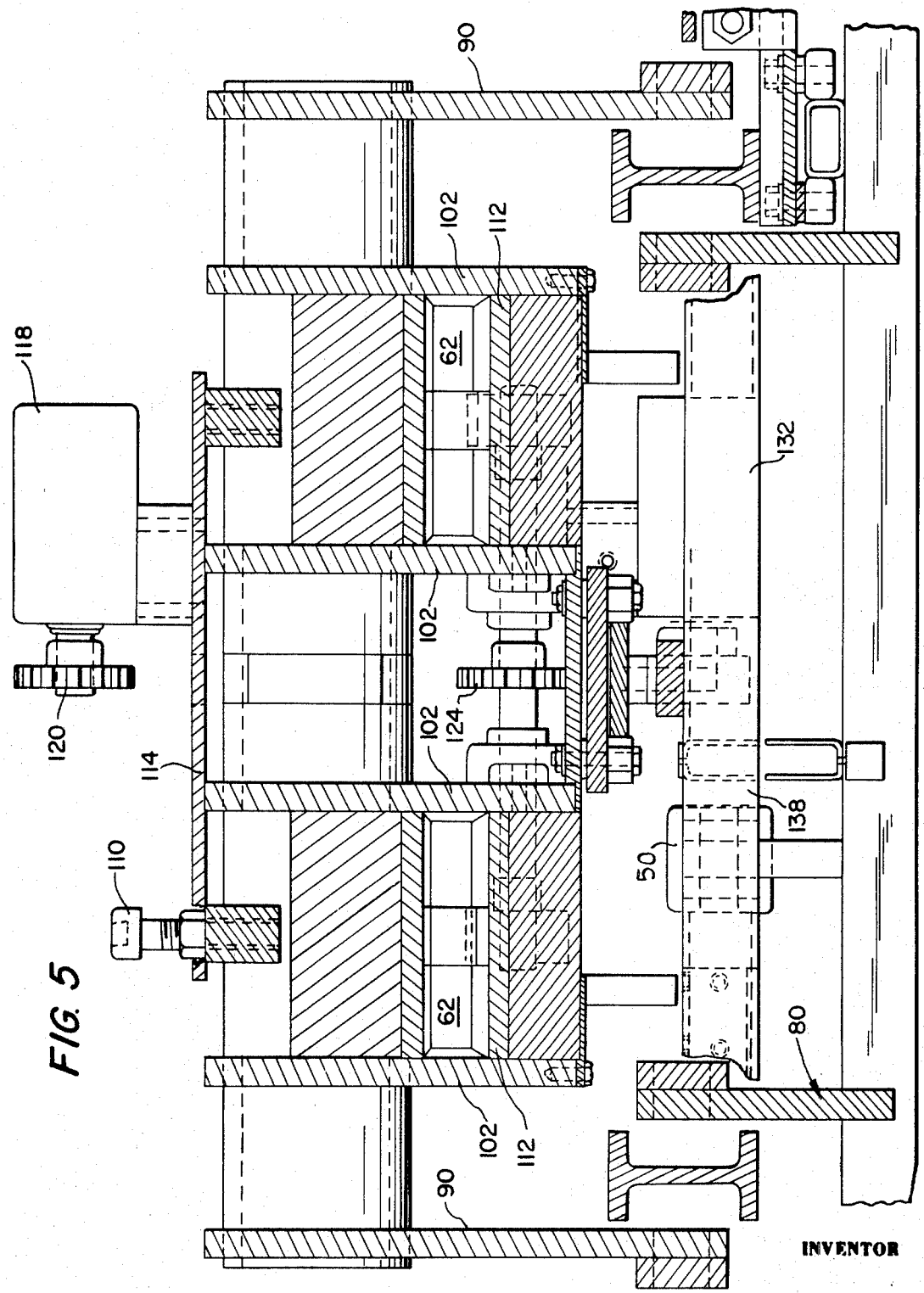

DOUBLE SIDE SHIFTING FORK-TYPE STACKER

BACKGROUND OF THE INVENTION

Stackers are widely used in warehousing systems to insert and remove loads in storage racks. Normally, an aisle extends between two parallel racks, and a stacker moves along the aisle for carrying loads to a desired storage position or for picking up loads from a storage position. The stacker usually has a mast which is vertically mounted on a roller support, which moves along overhead rails in the configuration of well known stacker cranes, or which is supported on the floor in the configuration of well known stacker trucks. A carriage moves vertically on the mast for positioning opposite a storage location in a rack. A carrier which is mounted on the carriage moves toward the rack whereupon the carriage is slightly lowered or slightly raised depending upon whether the operation is a storage sequence or withdrawal sequence, and then the carrier is withdrawn from the rack.

Two types of storage racks are well known. In a first type, the rack consists mainly of vertical load members with short horizontal cleats for holding pallets. In a similar device, pallets may have cleats which fit into holes on vertical members of a storage rack. In both of those cases, the stacker carrier may be configured with a shuttle platform which moves into the rack beneath a pallet and between the supporting cleats.

In the other basic type of storage rack, horizontal shelf members or beams support the pallets. Shuttle platforms cannot be used with such racks, and it is conventional to use forks for inserting into the pallets.

The second type of storage rack has many advantages over the first type of storage rack. Two or more pallets may be stored on horizontal members extending between vertical upright members. Thus, far less vertical uprights need be used when servicing a rack with forks rather than with shuttles. The second type of storage rack, that is the rack with horizontal members between beams, requires less precision in construction and requires far less steel, less labor and less shipping cost. Therefore, it is highly desirable to provide fork-type pallet handling stackers for use in narrow aisles. For best economic use of equipment, it is highly desirable that the forks be movable to service either side of a narrow aisle.

While shuttle platforms may be constructed for movement either to the left or to the right of the carriage, it is not as easy to mount the forks for operation on either side of the carriage. Since pallets are usually constructed with a central upright member, spaced forks must be supported at one end and must be cantilevered throughout their length for insertion into the pallet. A problem thus exists of how to support the forks at one end while being able to use the forks on either side of the aisle.

One attempt at a solution of the problem of being able to support the forks on either side of the aisle has been to use two pair of forks which are joined to each other at substantially a right angle. A pivot at the point where the forks are joined underlies a stop so that one pair of forks resting vertically against the stop supports the other pair of forks in a horizontal position for holding a load.

The pair of forks which is vertically supported adds unnecessary weight to the apparatus. The forks cannot be switched from one side to another while the stacker truck is in a narrow aisle because the hypotenuse distance between tips of the forked pairs is usually wider than the aisle.

SUMMARY OF THE INVENTION

The broad objectives of the invention are accomplished by supporting horizontally oriented forks in a head on top of a frame, and moving the head and locked forks over the frame into and out of a storage rack on one side of the frame and moving the head over the frame while relatively moving the forks horizontally through the head to position the head and the forks for insertion of the latter into a rack on the opposite side of the frame.

In a preferred form of the invention, the frame is movable laterally with respect to a stacker carriage or platform, and the frame carries at lateral extremities thereof sensors which contact horizontal members on a rack as the frame is moved into engagement with the rack. As the sensors are depressed, indicating contact with the rack, power is supplied to a motor or actuator which moves the head over the frame, carrying the forks into the rack structure. When picking up a load, the carriage frame, head and forks are raised to lift a pallet before the head and forks and subsequently the frame are withdrawn. In a storage sequence, the elements are lowered after the forks have been extended into the rack.

In a preferred embodiment of the invention, a rectangular frame is mounted on rollers which permit horizontal movement of the frame transverse to a direction of an aisle. A head is mounted on rollers which move along a frame permitting movement of the head along the frame. Preferably, the head has upright plates spanned by a rigidly connected supporting member. Bearing blocks or rollers anchored in the supporting member hold forks and constrain their motion to pure horizontal reciprocation in the direction of frame movement. Each of the forks has an elongated drive surface, preferably a rack formed in a recess on the bottom. A shaft which is oriented transverse to the forks is mounted for rotation in the head beneath the forks. Pinions which are keyed to the shaft engage the racks on the bottom of the forks. A motor, preferably a reversible hydraulic motor is connected to the shafts by gears, and if necessary a chain, to drive the forks through the head upon being supplied with power in one direction. Another hydraulic motor mounted on the head has a pinion which engages an elongated driving surface, preferably a rack on the frame.

In one form of the invention, a movable frame carries at opposite ends depressible shoes in a normally extended position. When the shoes are depressed, such as by rack contact, the shoes actuate a switch which opens a solenoid valve permitting power, preferably hydraulic fluid to be supplied to the latter motor, which drives the head across the rack.

Valves supplying fluid to the two motors are interconnected so that when a fork changing operation is selected, fluid is supplied to the fork driving motor to drive the forks in one direction while fluid is supplied to the head driving motor to drive the head in the opposite direction.

In one form of the invention, the frame is moved on the platform by a single central null position actuator cylinder and piston.

One object of this invention is the provision of a side loading stacker having forks operable on either side of the stacker, the forks being supported in a head which is movable over a frame.

Another object of the invention is the provision of a side loading stacker having forks operable on either side of a frame, having a frame shiftable to either side of a carriage to support a fork-holding head and having sensing means in the frame for determining when the frame is in contact with the rack structure and for enabling operation of the fork movement into the rack when the rack is sensed.

These and other objects of the invention are apparent in this disclosure which is composed of the foregoing and ongoing specification, including the claims and the drawings.

BRIEF DESCRIPTION OF THE DRAWINGS

FIG. 4 is an end elevation of the forks and head, which corresponds to a side elevational detail of the apparatus shown in FIG. 1.

FIG. 5 is a detail of the fork carrying apparatus.

DETAILED DESCRIPTION OF THE DRAWINGS

Figure 1:
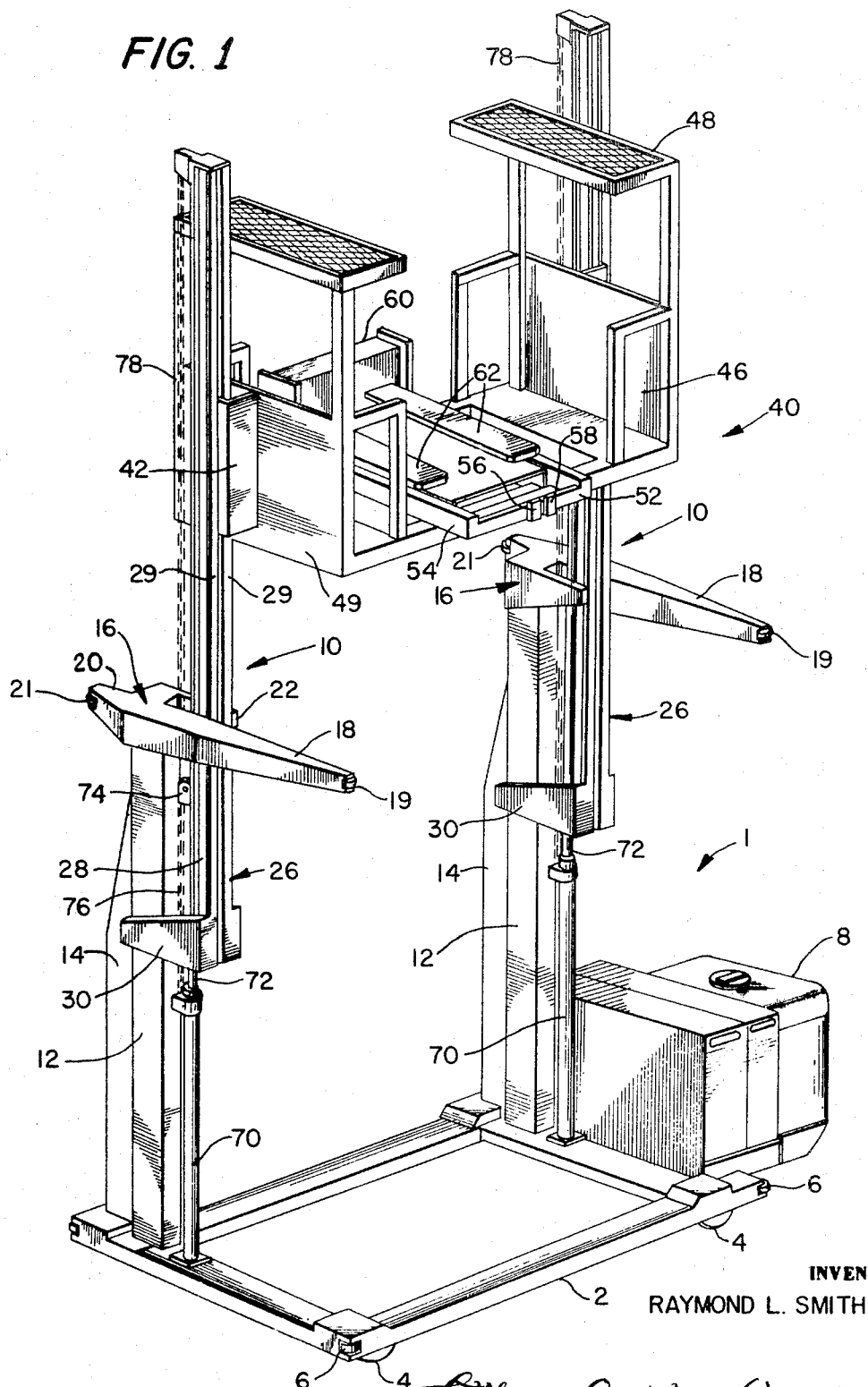
FIG. 1 is a perspective view of one form of a side loading stacker, showing the side shifting forks.

With reference to FIG. 1, a narrow aisle warehousing stacker truck is generally referred to by the numeral 1. The truck of the preferred embodiment comprises a rectangular base frame 2 with support rollers 4 near each angular extremity. Guidance wheels 6 are mounted at angles of the frame for contacting horizontally elongated surfaces on rack structures adjacent the narrow aisles. Hydraulic power and propulsion unit 8 is connected at one end of frame 2, preferably by an elongated transverse pivot or hinge so that the weight on drive and steering wheels under power unit 8 is independent of the weight on frame 2.

In the embodiment shown in the drawings, masts 10 have fixed tubular sections 12 which are mounted on the front and rear members of frame 2 near one side thereof. Buttresses 14 provide lateral stabilization of the masts. In a preferred embodiment, the tubes 12 hold hydraulic fluid and act as large cooling reservoirs. Hydraulic lines in base 2 connect the reservoir mast tubes 12 with pumps in power unit 8.

The fixed mast sections 12 are capped by laterally extending brace members 16. Elongated horizontal arms 18 extend across the truck and terminate in wheels 19 which engage horizontally elongated surfaces on the rack structure adjacent the narrow aisles. In a similar manner, shorter extensions 20 extend laterally in the opposite direction and terminate in rollers 21, which engage corresponding rack surfaces on an opposite side of the aisle.

Inner lateral extensions 22 are parallel to the elongated arms 18. Opposed inward facing rollers on arms 22 and 18 engage inner surfaces of the flanges of I beams which form the movable mast portion 26.

Each movable mast section 26 is formed with two I beams having parallel webs 28 oriented transverse to a forward direction of the truck.

Lower ends of the movable masts 26 are provided with horizontal extensions 30 which overlie the fixed tubular masts 12. Rollers are mounted in each support 30 for engaging opposite surfaces of fixed mast elements 12.

Carriage 40 is supported on the movable mast by supporting extensions 42, which extend between the parallel I beams, and which carry rollers for engagement with inner surfaces of flanges 29 of the I beams which make up movable masts 26.

In the embodiment shown in FIG. 1, operator's platform 46 has lift and drive controls which are omitted from the drawing for clarity. An overhead guard 48 protects the operator. A helper's station 49 is similar to the operator's station 46.

Figure 6:
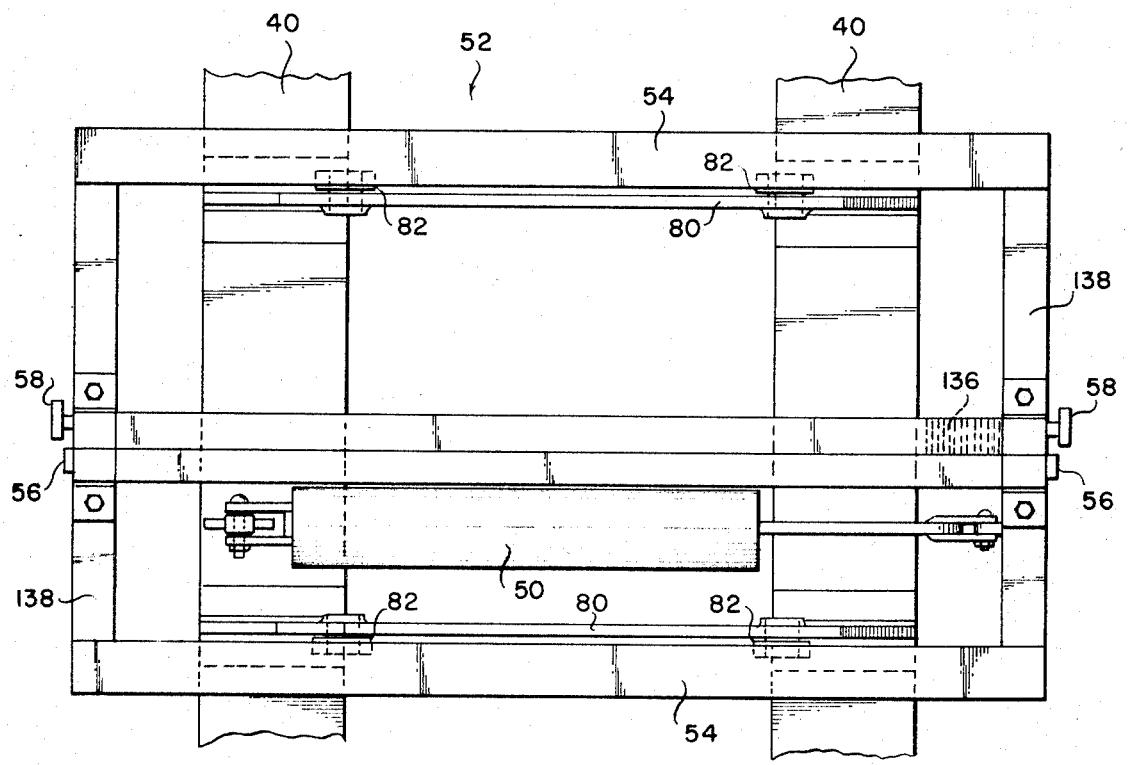
FIG. 6 is a top elevation view of the frame as shown in FIG. 3 with the forks and head removed.

A double side loader capable of operating at either side of the truck is mounted on carriage 40. Referring to FIG. 6, a rectangular frame 52 preferably comprises two parallel interconnected I beams 54 interconnected by end members 138. Frame 52 is capable of sliding laterally in either direction by operation of the cylinder 50. Rollers 82 fixed to carriage 40 and mounted within frame 52 engage flanges of the I beams 54 and support the frame for outward movement.

Feet 56 and 58, which are duplicated at opposite ends of frame 52, engage pallet-supporting horizontal rack members. Foot 56 is fixed to frame 52, while foot 58 extends slightly outward and is depressible into alignment with foot 56. Foot 58 indicates engagement with a rack member when it is depressed. Head 60 is then driven across frame members 54, carrying the forks 62 into the rack.

Parallel hydraulic cylinders 70 have pistons 72 with sheaves 74 at their upper extremities. Chains 76 have first ends connected to the fixed mast 12 or to base 2 and have second ends connected to lower ends of the movable mast portions 26. As pistons 72 are driven upward, chains 76 carry mast sections 26 upward at twice the speed of the pistons.

Chains 78 have first ends which are connected to fixed mast portions 12 and have second ends which are connected to carriage 40. As the movable mast is lifted, chains 78 carry carriage 40 upward at four times the speed of piston 72.

Referring to the remaining FIGS. 2-5, the construction and operation of the forks, head and frame are shown. A vertically moving stacker carriage 40 supports upright members 80. Rollers 82 on fixed members 80 engage inner surfaces of inward extending flanges on I beams 54, which form part of frame 52. Forward extending lugs 84 mount horizontal rollers 86. Rollers 86 guide channel 88 which is welded to the bottom flange of frame I beam 54. Rollers 86 and channel 88 facilitate and maintain the transverse alignment of I beams 54. A hydraulic cylinder 50 shown in the FIG. 5 detail is connected between carriage 40 and frame 52 to drive the frame across the carriage as supported on rollers 82 and as guided by rollers 86.

Figure 2:
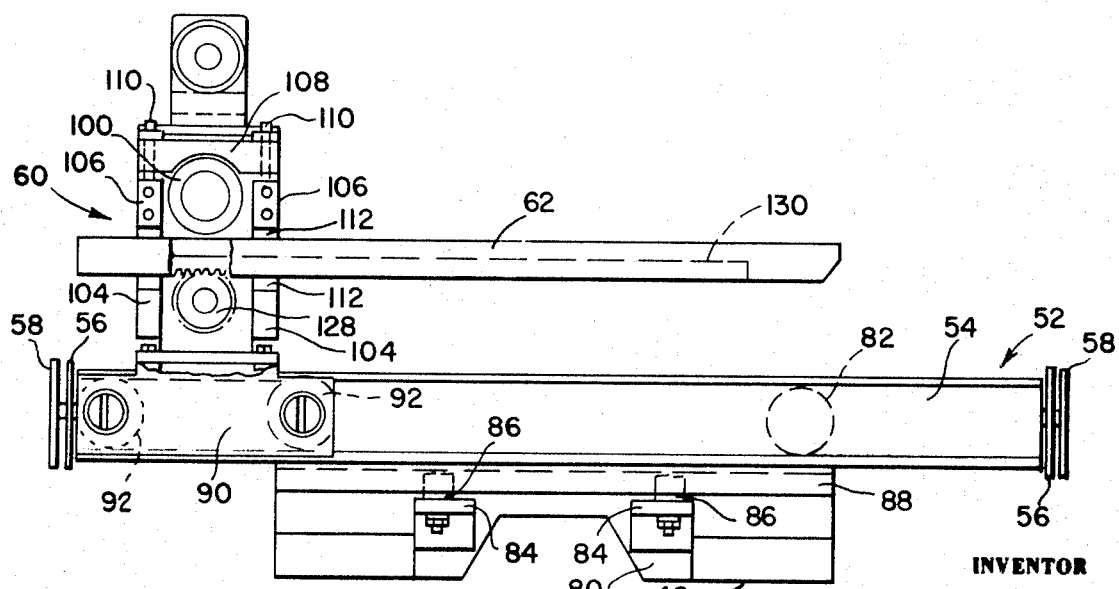
FIG. 2 is a side elevation of the double sided carrier portion of the side loading stacker shown in FIG. 1.

As seen in FIG. 2, opposite ends of frame 52 are fitted with fixed bumpers 56 and depressible bumpers 58. As a bumper 58 is depressed to the level of bumper 56 by engagement with the rack structure while frame 52 is moving toward the rack, a switch is closed which enables head 60 to be moved across I beams 54.

Figure 3:
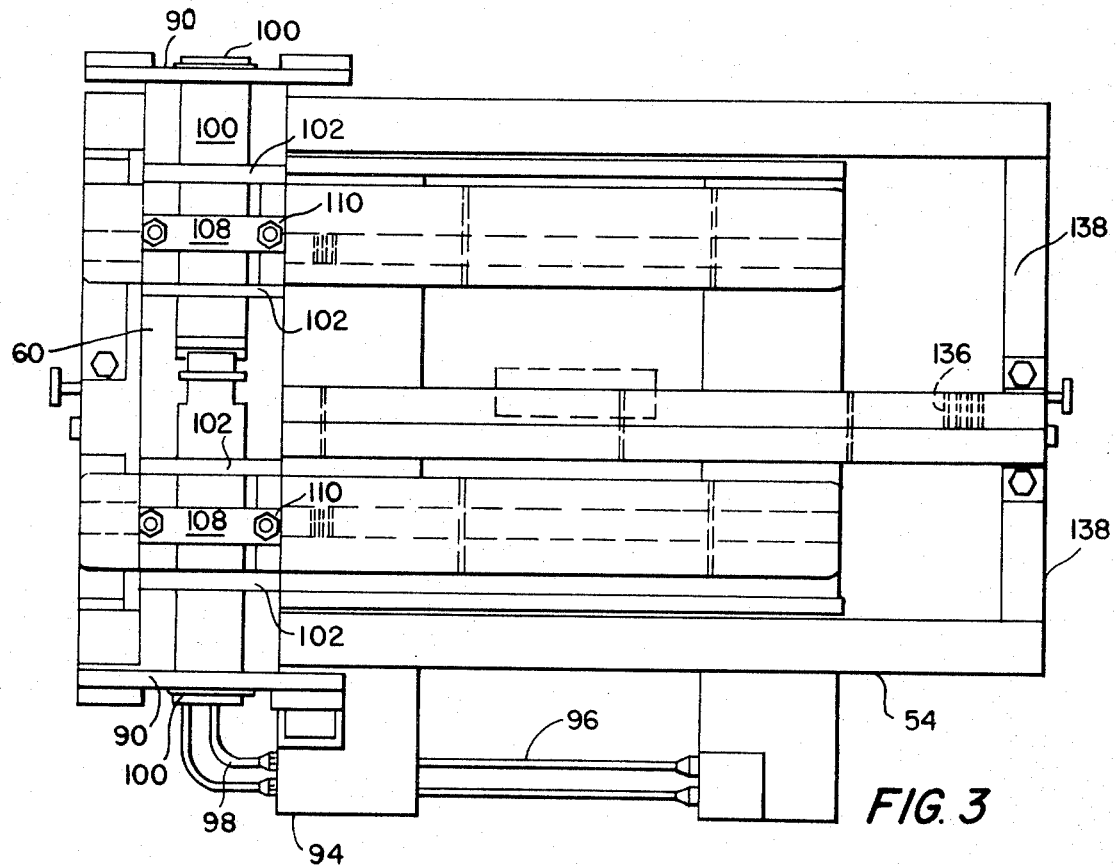
FIG. 3 is a plan view of the fork carrying portion shown in FIG. 2.

Head 60 is composed of two parallel inverted T-shaped plates 90 as shown in FIGS. 2 and 3. The lower wide ends of the plates support rollers 92 which are positioned within the outer flanges of I beams 54. The forward plate 90 supports a take-up roll 94 around which hydraulic lines 96 and electrical cables are wrapped. As the head 60 moves to the left, as shown in FIG. 3, cables 96 are pulled from take-up roll 94. As the head 60 moves to the right, roll 94 automatically takes up the cables 96. Cables 98 lead into head 60.

The upper ends of plates 90 are welded to tube 100. A central portion of the tube has a reduced diameter. Spaced slightly inward from the end plates and extending downward therefrom are fork-supporting housing plates 102 which are welded to pipe 100. The lower portions of the plates are joined by fork support blocks 104 which are welded to the plates 102, and which may be welded to end plates 90 as shown in FIG. 4. Fork hold down blocks 106 are positioned above fork 62 and fork support blocks 104. Hold down blocks 106 are secured in housing plates 102 for preventing up and down motion. Adjusting screw blocks 108 are welded to the top of support tube 100 between housing plates 102. Adjusting screws 110 with lock nuts control the downward pressure upon adjustable hold down blocks 106 and the pressure on bearings 112. Adjustment screws 110 are adjusted so that there is sufficient pressure on the bearing blocks to prevent the tipping or rotation of the forks while there is little resistance to sliding of the forks through the blocks.

Between inner housing plates 102 are connected upper plate 114 and a lower plate 116. Hydraulic motor 118 is mounted on the upper plate. Sprocket 120 on hydraulic motor 118 drives roller chain 122 which drives the sprocket 124 shown in FIGS. 4 and 5. Sprocket 124 is keyed to shaft 126, and opposite ends of the shaft are keyed to pinions 128.

Pinions 128 engage racks 130 which are connected to recesses in lower surfaces of forks 62. Turning hydraulic motor 118 in either selected direction turns shaft 126 and drives forks 62 together in the selected direction.

Hydraulic motor 132 is mounted on the bottom of plate 116, as shown in FIGS. 4 and 5. Sprocket 134 on motor 132 engages rack 136, which is best shown in FIG. 3. Rack 136 is an integral part of frame 52. End pieces 138 of frame 52 connect the rack 136 to side members 54. When motor 132 is energized, pinion 134 engages the relatively fixed rack 136, driving the pinion 134, motor 132 and head 60 across the frame. Rollers 140 are mounted on the bottom of plate 116. As the motor draws the head along rack 136, rollers 140 engage opposite sides of the rack 136 to maintain alignment.

As shown in FIG. 5, a hydraulic cylinder 50 is connected between base 80 and cross piece 138 to drive frame 52 with respect to the relatively fixed base of the carriage 40.

While the invention has been particularly shown and described with reference to a preferred embodiment thereof, it will be understood by those skilled in the art that various changes in form and details may be made therein without departing from the spirit and scope of the invention.

What is claimed is:

1. Double side loading warehousing apparatus comprising a support, a horizontally oriented frame movably mounted on the support for horizontal movement relative thereto, actuator means connected to the frame and to the support for moving the frame with respect to the support, a head movably supported on the frame adapted for movement therewith and movement parallel thereto, first propulsion means connected to the frame and to the head for moving the head parallel to the frame, load supporting forks horizontally mounted in the head adapted for movement therethrough parallel to the frame, second propulsion means mounted in the head and connected to the forks for driving the forks through the head while the head moves across the frame in the opposite direction whereby the forks remain in a substantially fixed relation to the frame, and sensing means mounted on opposite ends of the frame for sensing a warehousing rack, thus permitting the head to move relative to the frame in the direction of the sensed rack, while the forks remain fixed with respect to the head, thereby projecting the forks into the rack.

2. The apparatus of claim 1 wherein the second propulsion means comprises elongated propulsion surfaces on lower surfaces of the fork, a shaft mounted beneath the forks transversely to a longitudinal direction of the forks, pinions fixed to the shaft in engagement with propulsion surfaces on the forks and motor means rotably connected to the shaft and power means connected to the motor means for supplying power to the motor means for turning the shaft and for driving the forks thereby through the head.

3. The apparatus of claim 2 wherein the propulsion surfaces comprises gear toothed racks at the bottom of the forks.

4. The apparatus of claim 1 wherein the first propulsion means comprises an elongated driving surface mounted on the frame in a direction parallel to the forks, a drive motor mounted on the head and having connected thereto rotary means mounted beneath the driving surface in engagement therewith and power supply means connected to the drive motor for supplying power to the motor, thereby driving the motor and head with respect to the elongated driving surface on the frame.

5. The apparatus of claim 4 wherein the elongated driving driving surface comprises a rack mounted on the frame and wherein the rotary means comprises a pinion in engagement with the rack.

6. The apparatus of claim 5 wherein the rack comprises a downward facing rack mounted on a centrally positioned frame member which extends through a downward extending bracket on the head.

7. The apparatus of claim 1 wherein the frame comprises two parallel structural members connected at opposite ends by cross members and oriented parallel to the forks and having friction reducing means interconnecting the structural members and the head and interconnecting the structural members and the support whereby movement of the frame with respect to the support and movement of the head with respect to the frame is facilitated.

8. The apparatus of claim 7 wherein the structural members are I beams having vertically oriented webs and wherein the friction reducing means are groups of rollers which interconnect the head and the support with horizontally oriented webs of the I beams.

9. The apparatus of claim 8 wherein the head comprises first and second groups of rollers mounted between outer flanges of the I beams, first and second plates extending upward respectively from the first and second groups rollers, suspension means anchored to the plates above the I beams, fork receiving friction reducing means mounted in the suspension means for permitting longitudinal movement of the forks through the suspension means and for preventing rotation of the forks.

10. The apparatus of claim 7 further comprising rack sensing means mounted at opposite extremities of the frame in the direction of the forks and connected to the first propulsion means for permitting operation of the first propulsion means to drive the head in a direction of a sensed rack with respect to the frame.

11. The apparatus of claim 1 wherein the head comprises first and second roller means mounted on opposite sides of the frame, first and second plate means extending upward from respective first and second roller means, suspension means fixed between the plate means and anti-friction fork receiving means mounted in the suspension means for receiving load supporting forks for movement therethrough.

12. Materials handling apparatus comprising parallel forks having first and second ends, bearing means comprising upper and lower bearing blocks overlying and underlying the forks at first ends thereof, support means connected to the bearing means for holding the bearing means against the forks and for supporting the forks spaced from a base, adjustment means for moving upper blocks with respect to lower blocks for permitting translation of the forks through the blocks while restricting transverse up and down movement of the forks, and drive means connected to the support means and connected to a base for driving the support means across the base.

13. The apparatus of claim 12 wherein the support means comprises a generally horizontally oriented support member and parallel vertical members connected to and depending from the support member, wherein the bearing means are mounted in the vertical support members.

14. The apparatus of claim 13 wherein the support member comprises a tube having at at least one end thereof means for movably supporting the tube on a base.

15. The apparatus of claim 14 wherein the vertical members comprise four parallel plates welded to the tubular support member transverse to an axis thereof and wherein the bearing means comprise lower bearing blocks connected to the plates remote from the tube and upper bearing blocks movably connected to the plates and adjustment means having first portions connected to the tubes between pairs of plates and having second portions connected to upper bearing blocks whereby moving the second portions with respect to the first portions adjusts normal pressures of the bearing blocks on the forks.

16. The apparatus of claim 13 further comprising end plates having upper portions connected to opposite ends of the support member and roller means mounted on bottom portions of the end plates for engaging a base.

* * * * *